United States Patent Office 2,797,985
Patented July 2, 1957

2,797,985

METHOD OF PRODUCING SYNTHETIC TOPSOIL

John D. Larson, Hinsdale, Ill.

No Drawing. Application December 11, 1950,
Serial No. 200,313

2 Claims. (Cl. 71—8)

This invention relates to a method by which various raw earth materials may be processed in a relatively short period of time to produce a soil of unusually high fertility, and to the soil product of such processing.

While naturally occurring or virgin soils vary greatly in their composition both as regards organic and inorganic matter, texture and other qualities and are exceedingly complex, some capable of sustaining one type of plant life and not another, and others capable of sustaining many types of plant life, it is well recognized that with agricultural and other practices or conditions which rob the soil of constituents necessary to sustain life or necessary to produce healthy and vigorous life, plant, lower animal and human, no soil can be wholly satisfactory over a long period. Efforts to restore and sustain the fertility of soils generally take the form of allowing it to lie fallow for a period, crop rotation, applying one or another type or combination of fertilizer, returning to the soil some part of the products removed therefrom or a combination of such procedures. In no case, however, do such procedures maintain or restore the soil to its original virgin character probably because so many of the constituents and conditions which make the soil quality, are destroyed or dissipated, and cannot be restored by such simple expedients. Furthermore, by reason of the relatively infinite variation in soils, some are of poor quality for lack of one or more constituents necessary to life of plants and animals and some for lack of other qualities.

The bulk of most soils is composed of inorganic mineral elements in a raw state relatively unavailable for use by plant life, except after long periods of disintegration, recombination, and other "conditioning" by the forces and processes of nature. The mere fact that a given soil may contain potentially available quantities of a vital element or compound such as potassium or phosphoric acid, does not, in and of itself, establish a criterion for the fertility of the soil or the availability of such element or compound for plant use. Unless the soil constituents needed by the plant are of such nature and in such condition that they may be utilized by plant life, they might just as well not be present at all; they will remain wholly inert and useless, being of value only to provide bulk for stability and other purely mechanical purposes. For these reasons, many soils potentially rich in food elements may produce unsatisfactory or barren results.

One of the primary objects of my present invention is to provide, synthetically, a soil, and a process by which it can be made in a short period of time, which is of such composite type and of such character, that it will be satisfactory for almost any kind of agricultural crop purpose, the soil containing or being, in effect, a composite of all or substantially all natural soils insofar as ingredients required for proper and healthy plant and animal growth may be concerned, and of such character and condition that the elements requisite for plant food are immediately and continuously available to the plant. In this connection it may be noted that the invention is based on the premise that the topsoil complex of the earth as a whole comprises not less than fifteen (15) elements, in one form or another essential to the plant life, and that the so-called inorganic mineral elements and their compounds must be in such form or character that they are available to and for use by the plant life to be supported.

Another primary object or purpose is to reproduce, artificially, a soil which embodies all essential properties, chemical, physical, biological, bacteriological and mechanical, and which is so constituted that it is adapted to function immediately and fully upon maturity of the processing.

Still another important purpose is to provide a synthetic top soil which will have such desirable characteristics and properties as friability or granulation to promote proper drainage but with such capillarity as will enable it to adsorb, absorb and hold the water necessary for plant use, and having flocculence to admit of easy cultivation and to prevent formation of clods or crusting.

Many other objects as well as the advantages of both process and product will be understood and appreciated after reading the following description and claims.

In the production of natural topsoil from the materials of nature acted upon by the forces of nature, primary rocks such as granite, gneiss, porphyry, feldspar and the like are disintegrated and decomposed by the forces of nature until a virgin soil of a plant life supporting character is produced.

In the production of a synthetic topsoil in accordance with my invention, selected ingredients are treated and acted upon in accordance with my improved process or method to produce a soil of the requisite characteristics which I have found contains in its most effective and preferred form the following primary elements, and in addition certain trace elements which will be hereinafter more specifically mentioned. The primary elements comprise:

| | |
|---|---|
| Calcium | Nitrogen |
| Carbon | Oxygen |
| Chlorine | Phosphorus |
| Fluorine | Potassium |
| Hydrogen | Silicon |
| Iron | Sodium |
| Magnesium | Sulphur |
| Manganese | |

In addition there are included certain trace elements, such as:

| | |
|---|---|
| Cobalt | Copper |
| Chromium | Boron |
| Molybdenum | Tin |
| Titanium | Silver |
| Vanadium | Zinc | and possibly others.

The foregoing elements do not exist in the free or chemically uncombined state, but will be found in the raw materials or in the final product in combinations including the phosphates, sulphates, carbonates, silicates and chlorides of various of the elements.

The importance of trace elements has been recognized, with the result that fertilizer producers have included them in their fertilizer formulae for spreading on the soil. The indiscriminate use of such trace elements has, however, been discouraged by the fact that toxic effects resulted from the application to the land of a slight excess of a trace element, even as low as pound or two per acre. The danger of toxic effects resulting from the employment of such trace elements is entirely obviated when synthetic topsoil produced in accordance with my novel method is applied to the land as a top dressing or is plowed under.

In addition to the primary and trace elements employed in my process, there are utilized in the process either by the addition thereto or by the natural production in carrying out the process, many organic acids such as humic, ulmic, crenic, and apocrenic, etc., which combining with the minerals employed form colloidal compounds which persist in the end product or are converted during the process into other chemical constituents.

While synthetic topsoil may be produced by various combinations of the basic ingredients and by such ingredients in various forms and while the processing may be varied within reasonable limits, it is most desirable that these ingredients and their condition, both physical and chemical, and the manner by which they are combined and processed, be such as to give optimum results in quality and period of preparation and maturity. To this end the fundamental technique employs the following materials:

(1) Pulverized igneous rock such as granite, gneiss, feldspars, or volcanic ash;

(2) Pulverized sedimentary rock such as phosphate rock, limestone, dolomite, marl, or air slacked lime;

(3) Pulverized and, preferably, hydrous calcium sulphate as gypsum or land plaster, or glauberite $$(Na_2SO_4 \cdot CaSO_4)$$

(4) Powdered clay (basically hydrous aluminum silicates but normally carrying other compounds such as compounds of iron, potassium, magnesium, etc.);

(5) Organic materials of the character of peat, lignin, sawdust and wood shavings, wood and cannery waste matter, castor bean hulls and tung nut shells;

(6) Organic material of the character of horse manure or sludge from sewage disposal or treatment plants.

In my prior application filed December 13, 1946, Serial No. 716,183, of which this application is a continuation in part, the inorganic and organic materials above identified were piled in alternating strata of organic and inorganic materials to a substantial height, and, except for the natural or artificial application of moisture and heat, were left to disintegrate for a period of several months and thereafter at intervals the mass was shoveled over or otherwise mixed, until at the end of an indeterminate period of somewhere between one and three years time the disintegration and decomposition had resulted in a soil of the character of that virgin soil heretofore produced by nature from rocks acted upon by natural conditions for at least hundreds of years before plant sustaining soil had been attained. In contradistinction, my present invention enables the production synthetically of an excellent plant growing and sustaining soil in a relatively short period of a few weeks. In accordance with my present method, the stacking of the materials in strata and the prolonged waiting for disintegration and decomposition are eliminated. The resultant desired product is attained in an amazingly short time by following the method now outlined.

The mineral ingredients employed are mechanically disintegrated and reduced, preferably in a suitably constructed rod mill, until the material employed is such as will pass through a No. 36 mesh screen.

Instead of disposing the minerals in strata of definite depths and alternating with strata of organic material, my present invention contemplates the mixing and blending of the inorganic materials during a grinding process to produce a homogeneous mixture consisting of two parts by weight of granite, two parts clay, two parts limestone, and one part gypsum. Assuming two hundred pounds each for granite, limestone and clay, with one hundred pounds for gypsum, this total seven hundred pound batch is poured into a digester tank provided with a suitable agitator, preferably in the form of a worm-screw.

To organize the seven hundred pound batch of raw mineral ingredients into available plant food, requires a cellulose-fermentation process. This is effected through the addition to the digester tank of approximately two and one-half times the weight of the raw screened mineral ingredients of organic material consisting preferably of approximately eight hundred pounds peat, four hundred pounds horse manure, and seven hundred pounds of sewage sludge. These ingredients are delivered into the digester tank, preferably simultaneously with the raw minerals, whereupon the action of the worm-screw mixes the various ingredients into an intimately blended mixture. Fermentation is initiated within a few hours after the mixing begins and within twelve to fourteen hours the heat of fermentation has raised the temperature of the mix a very substantial amount. The rate of fermentation and heat generation may be accelerated by the introduction of a potato-yeast culture, a solution of hippuric acid and by the addition of a small portion of completed product produced by my method which is sold under the trade-mark Normal Soil. The fermentation accelerator performs the function of an organic catalyst in hastening the decomposition of the cellulose material. As the mixing proceeds, the temperature continues to rise, and will reach within a few days a temperature of 120 or more degrees Fahrenheit, and in some instances may go as high as 160°.

The agitation of the worm-screw in exposing more and more surface of the mass to the entrance of air promotes the process of oxidation which, of course, is the essential feature of cellulose fermentation. Coincidentally, swarms of bacteria develop which attack the cellulose material vigorously, their activity being accelerated by the action of the catalytic agents, namely, the potato-yeast culture, the hippuric acid solution, and the added Normal Soil. Within the first twenty-four hours the appearance of the entire mass begins to turn dark, becoming progressively darker as fermentation proceeds, and finally attaining the dark, chocolate-colored hue of humus or virgin soil.

A notable phenomenon in my fermentation process is its departure from the characteristics usually observed where the accumulation of carbon dioxide, butyric acid, and various humic acids soon stops fermentation. In carrying out my method, on the other hand, the fermentation proceeds uninterruptedly with no stoppage due to excess acidity. It is my belief that this result is attained by reason of the fact that the blended raw minerals employed are of an alkaline character such that the fermentation mass is maintained on an average at approximately a pH of 7.00.

The mixing of the organic and inorganic ingredients by means of the worm-screw is continued, and the fermentation resulting in decomposition proceeds for a period of seven days to ten days, whereupon the mixture is thoroughly homogenized and decomposed into an earth-like end product possessing the requisite characteristics for the production and sustaining of plant life, and which I term Normal Soil. This soil may be employed alone for the growing of various products or, as is most generally done, it may be spread in regulated quantities over the surface of exhausted lands to form a topsoil with which the poor underlying soil is enriched as they become admixed.

The final product is a chocolate brown in color, highly granular or friable, and so flocculent as to permit of cultivation, wet or dry, without the formation of clods or lumps or heavy crusting of the surface. Washing and leaching of the soil is inhibited or minimized. Soil formed by the process and of the character disclosed herein has been made ready for use in a period of seven to ten days from the initiation of the mass and has been used for seed bed purposes and otherwise directly applied to the roots of the most delicate plants, shrubs, and other vegetation which benefited remarkably in their vitality and growth and with no deleterious results whatsoever.

Since the process and the ingredients may be varied substantially and for various purposes and without departing from the invention spirit, I do not desire to be limited to the preferred process and preferred form thereof disclosed herein, but, rather, only by the invention spirit and the scope of the appended claims.

Having thus disclosed the invention, I claim:

1. The method of producing a synthetic soil which comprises commingling a quantity of inorganic material consisting of approximately granite 2 parts, limestone 2 parts, clay 2 parts, and gypsum 1 part with approximately two and one-half times its weight of organic material consisting of peat 8 parts, horse manure 4 parts, and sewage sludge 7 parts, inducing fermentation in the mass by adding thereto a catalyzer such as potato yeast culture and hippuric acid, promoting the oxidation of the cellulose components by aerating the mass and agitating the mass until the constituents are thoroughly decomposed and blended into a homogeneous flocculent product embodying in a condition immediately available for assimilation by growing plants those ingredients requisite for the production and sustaining of plant life.

2. The method of producing synthetic soil containing the ingredients essential for the production and sustaining of plant life, which comprises depositing in a digester receptacle a quantity of comminuted inorganic material including in approximately the following proportions granite 2 parts, limestone 2 parts, clay 2 parts and gypsum 1 part, together with approximately two and one-half times by weight of organic material including peat 8 parts, sewage sludge 7 parts and horse manure 4 parts, introducing into said digester a fermentation accelerator, and agitating, aerating and blending the mass of organic and inorganic materials and said accelerator in the presence of heat and oxygen to thereby induce fermentation and oxidation of the cellular components of the mass until a homogeneous flocculent earth-like product is produced.

References Cited in the file of this patent

UNITED STATES PATENTS

| 1,260,103 | Wallace | Mar. 19, 1918 |
| 1,320,701 | Manns | Nov. 4, 1919 |
| 2,043,265 | Roeder | June 9, 1936 |

FOREIGN PATENTS

| 116,758 | Great Britain | June 20, 1918 |
| 435,380 | Great Britain | Sept. 16, 1935 |

OTHER REFERENCES

Garden Dictionary, published 1938 by Houghton Mifflin Co., pages 742–745.